(12) United States Patent
Novo Diaz et al.

(10) Patent No.: US 11,290,519 B2
(45) Date of Patent: Mar. 29, 2022

(54) METHOD FOR ENABLING A COMMUNICATION DEVICE TO RECEIVE A PARTIAL MODIFICATION OF A RESOURCE

(71) Applicant: Telefonaktiebolaget LM Ericsson (publ), Stockholm (SE)

(72) Inventors: Oscar Novo Diaz, Helsinki (FI); Jaime Jiménez, Helsinki (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 72 days.

(21) Appl. No.: 16/327,582

(22) PCT Filed: Aug. 22, 2016

(86) PCT No.: PCT/SE2016/050780
§ 371 (c)(1),
(2) Date: Feb. 22, 2019

(87) PCT Pub. No.: WO2018/038650
PCT Pub. Date: Mar. 1, 2018

(65) Prior Publication Data
US 2019/0238617 A1   Aug. 1, 2019

(51) Int. Cl.
*G06F 15/16* (2006.01)
*H04L 67/04* (2022.01)
(Continued)

(52) U.S. Cl.
CPC .............. *H04L 67/04* (2013.01); *H04L 67/02* (2013.01); *H04L 67/108* (2013.01);
(Continued)

(58) Field of Classification Search
CPC ......... H04L 67/04; H04L 67/12; H04L 67/02; H04L 67/1076; H04L 67/108;
(Continued)

(56) References Cited

U.S. PATENT DOCUMENTS

2002/0140729 A1\* 10/2002 Price ..................... G06F 16/972
715/749
2006/0242157 A1\* 10/2006 McCuller ................ H04L 69/04
(Continued)

FOREIGN PATENT DOCUMENTS

| WO | 2014107486 A1 | 7/2014 |
| WO | 2016048208 A1 | 3/2016 |
| WO | 2016100631 A1 | 6/2016 |

OTHER PUBLICATIONS

Author Unknown, "Delta update," Wikipedia, Dec. 11, 2014, accessible at https://en.wikipedia.org/w /index.php ?title= Delta_ update &oldid=637586983, 3 pages.
(Continued)

*Primary Examiner* — Johnny B Aguiar
(74) *Attorney, Agent, or Firm* — Withrow & Terranova, PLLC

(57) ABSTRACT

A first communication device transmits, to a second communication device, a first indication indicating a configuration enabling the first communication device to receive a partial modification of resources. The first communication device receives, from the second communication device, a second indication indicating a partial update, in time, associated with a resource and a value of a part of the resource. The first communication device further maintains an internal value of the part of the resource based on the second indication.

18 Claims, 9 Drawing Sheets

(51) Int. Cl.
| | | |
|---|---|---|
| *H04L 67/12* | (2022.01) | |
| *H04L 67/02* | (2022.01) | |
| *H04L 67/1074* | (2022.01) | |
| *H04L 67/146* | (2022.01) | |
| *H04L 67/60* | (2022.01) | |
| *H04L 67/01* | (2022.01) | |
| *H04W 80/04* | (2009.01) | |
| *H04W 4/70* | (2018.01) | |

(52) U.S. Cl.
CPC .......... *H04L 67/1076* (2013.01); *H04L 67/12* (2013.01); *H04L 67/146* (2013.01); *H04L 67/32* (2013.01); *H04L 67/42* (2013.01); *H04W 4/70* (2018.02); *H04W 80/04* (2013.01)

(58) Field of Classification Search
CPC ....... H04L 67/146; H04L 67/32; H04L 67/42; H04W 80/04; H04W 4/70
USPC ......................................... 709/203, 217, 219
See application file for complete search history.

(56) References Cited

U.S. PATENT DOCUMENTS

| | | | | |
|---|---|---|---|---|
| 2009/0094323 | A1* | 4/2009 | Koujina | H04L 67/306 709/203 |
| 2010/0257142 | A1* | 10/2010 | Murphy | G06F 11/1464 707/681 |
| 2015/0067154 | A1* | 3/2015 | Ly | H04L 67/26 709/224 |
| 2018/0004766 | A1* | 1/2018 | Darling | G06F 16/137 |
| 2018/0039683 | A1* | 2/2018 | Bonanni | G06F 16/2228 |

OTHER PUBLICATIONS

Extended European Search Report for European Patent Application No. 16914324.5, dated Feb. 4, 2020, 13 pages.

Van Der Stok, P., et al., "Patch and Fetch Methods for Constrained Application Protocol (CoAP) draft-ietp-core-etch-01.txt", Internet Engineering Task Force (IETF), Internet Society (ISOC), Jun. 24, 2016, XPO15113672 (retrieved on Jun. 24, 2016), pp. 1-17.

Author Unknown, IEEE Standard for Local and metropolitan area networks—Part 15.4: Low-Rate Wireless Personal Area Networks (LR-WPANS), IEEE Computer Society, IEEE Std 802.15.4, Sep. 5, 2011, 314 pages.

Bormann, C., "CoAP FETCH Method," Internet Engineering Task Force (IETF), CoRE, Internet-Draft, Intended status: Standards Track, Oct. 19, 2015, 6 pages.

Fielding, R. et al., "Hypertext Transfer Protocol—HTTP/1.1," Internet Engineering Task Force (IETF), Network Working Group, Request for Comments: 2616, Obsoletes: 2068, Category: Standards Track, Jun. 1999, 114 pages.

Hartke, K., "Observing Resources in the Constrained Application Protocol (CoAP)," Internet Engineering Task Force (IETF), Request for Comments: 7641, Category: Standards Track, TSSN: 2070-1721, Sep. 2015, 30 pages.

Van Der Stok, P., et al., "Patch Method for Constrained Application Protocol (CoAP)," Internet Engineering Task Force (IETF), core, Internet-Draft, Intended status: Informational, Mar. 15, 2016, 12 pages.

Veillette, M. et al., "Constrained Objects Language," Internet Engineering Task Force (IETF), Internet-Draft, Intended status: Informational, Nov. 1, 2015, 69 pages.

International Search Report and Written Opinion for International Patent Application No. PCT/SE2016/050780, dated Apr. 18, 2017, 12 pages.

Shelby, Z., "Constrained RESTful Environments (CoRE) Link Format," Internet Engineering Task Force (IETF), Request for Comments: 6690, Category: Standards Track, ISSN: 2070-1721, Aug. 2012, 22 pages.

Shelby, Z. et al., "CoRE Resource Directory," Internet Engineering Task Force (IETF), Internet-Draft, Intended status: Standards Track, Mar. 11, 2019, 73 pages.

Shelby, Z. et al., "The Constrained Application Protocol (CoAP)," Internet Engineering Task Force (IETF), Request for Comments: 7252, Category: Standards Track, ISSN: 2070-1721, Jun. 2014, 112 pages.

Veillette, M. et al., "Constrained Objects Language," Internet Engineering Task Force (IETF), Internet-Draft, Intended status: Informational, Jul. 18, 2016, 41 pages.

Examination Report for European Patent Application No. 16914324.5, dated Mar. 11, 2021, 7 pages.

* cited by examiner

METHOD FOR ENABLING A COMMUNICATION DEVICE TO RECEIVE A PARTIAL MODIFICATION OF A RESOURCE

TECHNICAL FIELD

Embodiments herein relate to a first communication device, a second communication device and methods performed therein for communication. Furthermore, a computer program and a computer readable storage medium are also provided herein. In particular, embodiments herein relate to handling data of a resource in a communication network.

BACKGROUND

A constrained network is a communication network that may have limited packet sizes, may exhibit a high degree of packet loss, and/or may have a substantial number of communication devices that may be in a sleep mode, e.g., powered off, at any point in time but periodically "wake up" for brief periods of time. Communication devices of constrained networks may be characterized by limits on throughput, available power, and/or Random Access Memory (RAM), and may be connected over a low power wireless connection such as IEEE 802.15.4 connection.

A Constrained Application Protocol (CoAP) is a specialized web transfer protocol used by constrained network nodes and within constrained networks, e.g., network nodes of low-power or lossy networks. The web transfer protocol is designed for machine-to-machine (M2M) applications such as smart energy and building automation. CoAP provides a request/response interaction model between application endpoints, supports built-in discovery of services and resources, and includes key concepts of the Web such as Uniform Resource Identifiers (URI) and Internet media types. Servers make resources available under a URL, and clients access these resources using methods such as GET, PUT, POST, and DELETE.

CoAP has a set of documents specifying additional functionalities that complements the original specification. Some of these documents are; *Observing Resources in CoAP, The Constrained Object Language (CoOL), Patch Method for Constrained Application Protocol (CoAP)* and *CoAP FETCH Method*. The first document is an extension of the CoAP protocol, the second document describes a new compressed management interface, while the last documents are defining new methods for CoAP.

The *Observing Resources in CoAP* document was created to avoid continuously polling for resources, since the state of a resource on a CoAP server can change over time. A resource as defined by RFC2616 is a network data object or service that can be identified by a URI, e.g. Resources may be available in multiple representations, e.g. data formats, sizes, or vary in other ways. Resources may be observed by CoAP clients, i.e. the CoAP clients retrieve a representation of a resource and keep this representation updated by the server over a period of time.

The *Patch Method for Constrained Application Protocol (CoAP)* document describes two new atomic CoAP methods: PATCH and iPATCH. The PATCH method was created to complement the PUT method in CoAP. A PUT method only allows a complete replacement of a resource. In case of resources with larger or complex data, or in situations where resource continuity is required, replacing a resource is cumbersome. The PATCH method described in the document allows for a partial modification of a resource. iPATCH is an idempotent version of PATCH.

The *CoAP FETCH method* document describes a new CoAP method called FETCH. The FETCH method provides a solution that spans the gap between the use of GET and POST. As with POST, the input to the FETCH operation is passed along within the payload of the request rather than as part of the request URI. Unlike POST, however the semantics of the FETCH method are more specifically defined.

The *Constrained Object Language* document describes a management interface adapted to constrained devices and constrained, e.g., low-power, lossy, networks. CoOL resources, such as data stores, protocol operations and notifications, are defined using a YANG modeling language. Interactions with these resources are performed using the CoAP web transfer protocol and payloads and specific CoAP options are encoded using the Concise Binary Object Representation (CBOR) data format.

As described before, CoAP has been extended with a very broad number of extensions to increase its efficiency in constrained networks. The FETCH, PATCH and iPATCH methods have been designed to complement the PUT and GET methods in CoAP and make them more efficient in some particular scenarios. As well, the CoOL language deals with the information transferred in CoAP, compressing it, using the YANG modeling language and the CBOR data format.

Another extension broadly used in CoAP is the "observe" extension. This extension is very useful since the state of the CoAP resources change continuously over time. However, the continuously transfer of CoAP information between the CoAP entities can create a large amount of network traffic when the CoAP resources are changing constantly. This amount of information cannot be reduced using any of the actual methods or extensions defined in CoAP leading to an inefficient use of resource that may limit the performance of the communication network.

SUMMARY

An object of embodiments herein is to provide a mechanism for improving performance of the communication network in an efficient manner.

According to an aspect the object is achieved by providing a method performed by a first communication device for handling data in a communication network. The first communication device transmits, to a second communication device, a first indication indicating a configuration enabling the first communication device to receive a partial modification of resources. The first communication device receives, from the second communication device, a second indication indicating a partial update, in time, associated with a resource and a value of a part of the resource. The first communication device further maintains an internal value of the part of the resource based on the second indication.

According to another aspect the object is achieved by providing a method performed by a second communication device for handling data in a communication network. The second communication device provides data of a resource to a first communication device in the communication network. The second communication device receives, from the first communication device, a first indication indicating a configuration enabling the first communication device to receive a partial modification of resources. The second communication device obtains, internally or from another communication device, an update of a part of the resource, which update comprises a value. Furthermore, the 25 second communication device transmits a second indication indicating a partial update, in time, associated with the resource and the value of the part of the resource.

According to yet another aspect the object is achieved by providing a first communication device for handling data in a communication network. The first communication device is configured to transmit, to a second communication device, a first indication indicating a configuration enabling the first communication device to receive a partial modification of resources. The first communication device is further configured to receive, from the second communication device, a second indication indicating a partial update, in time, associated with a resource and a value of a part of the resource. In addition, the first communication device is configured to maintain an internal value of the part of the resource based on the second indication.

According to still another aspect the object is achieved by providing a second communication device for handling data in a communication network, which second communication device is configured to provide data of a resource to a first communication device in the communication network. The second communication device is configured to receive, from the first communication device, a first indication indicating a configuration enabling the first communication device to receive a partial modification of resources. The second communication device is further configured to obtain internally or from another communication device, an update of a part of the resource, which update comprises a value; and to transmit a second indication indicating a partial update, in time, associated with the resource and the value of the part of the resource.

It is furthermore provided herein a computer program comprising instructions, which, when executed on at least one processor, cause the at least one processor to carry out any of the methods above, as performed by the communication devices. It is additionally provided herein a computer-readable storage medium, having stored thereon a computer program comprising instructions which, when executed on at least one processor, cause the at least one processor to carry out the method according to any of the methods above, as performed by the communication devices.

Disclosed herein are methods to interact with resources in a more granular way in e.g. Internet of Things. The more granular way allows the network bandwidth and the limited resources of e.g. constrained networks to be used more efficiently. In particular, embodiments herein relate to partially handling data of a resource in e.g. a low-power lossy network. Embodiments herein thus enable that every time a part of the resource changes, which resource is being e.g. observed by the first communication device, it is just the part of the resource that has been changed that is sent and updated in the first communication device. This leads to an efficient handling of data in the communication network resulting in an improved performance of the communication network.

BRIEF DESCRIPTION OF THE DRAWINGS

Embodiments will now be described in more detail in relation to the enclosed drawings, in which.

DETAILED DESCRIPTION

Figure 1:
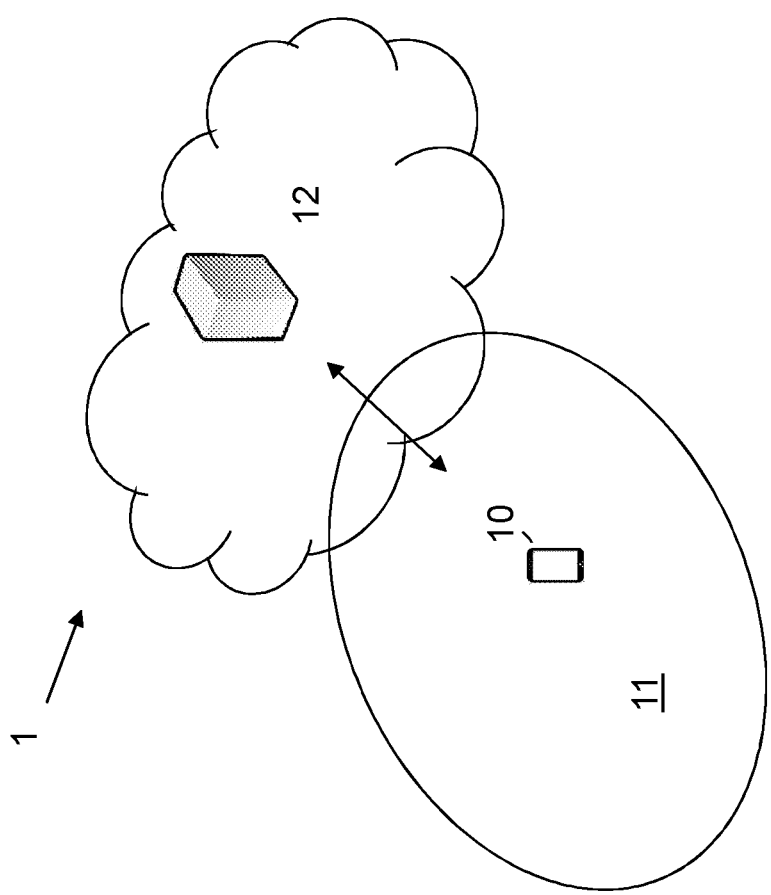
FIG. 1 is a schematic overview depicting a communication network according to embodiments herein.

Embodiments herein relate to communication networks in general. FIG. 1 is a schematic overview depicting a communication network 1. The communication network 1 may use a number of different technologies, such as W-Fi, Bluetooth Low Energy, ZigBee, LoRA, just to mention a few possible implementations.

In the communication network 1 communication devices, e.g. a first communication device 10 such as a M2M device, a wireless device, a user equipment and/or a wireless terminal, communicate with one another or the communication network. It should be understood by those skilled in the art that "communication device" is a non-limiting term which means any terminal, communication terminal, user equipment, Machine Type Communication (MTC) device, Device to Device (D2D) terminal, or node e.g. smart phone, laptop, mobile phone, sensor, relay, mobile tablets or any device communicating within a network or a service area 11. The first communication device 10 may be referred to as a first endpoint or a client.

The communication network 1 further comprises a second communication device 12. The second communication device 12 may be referred to as a second endpoint or a server. The second communication device 12 may e.g. be a Resource Directory. The second communication device 12 may be a CoAP server or an access point such as a wireless local area network (WLAN) access point a stand-alone access point or any other network unit capable of serving a communication device within the service area 11.

Embodiments herein relate to handling data e.g. updating of CoAP resources in the first communication device 10. Embodiments herein enable that every time the state of a resource changes, it is just the part of the resource that has been changed that is sent and updated in the first communication device 10. In prior art, when a communication device performs an Observe operation on a resource, each notification is an additional CoAP response sent by the CoAP server which includes a complete representation of the resource state. It is herein described a way to partially update a resource describing ways to interact with one or more resources in e.g. a constrained environment in a more granular way. Resources are treated in an atomic way, as minimal units of information.

Embodiments herein thus provide a new degree of granularity in the resources that would make more efficient use of network bandwidth as it transfers a minimal description of the changes, rather than the entire new instance of the resource. This information is referred to as "delta" in this document for a matter of clarity. The delta is defined as a difference between two instances of the same information. The utilization of one or more delta attributes is beneficial in e.g. Internet of Things (IoT), especially since resource representations are increasing in size with new data structure representations such as YANG models or SENML/JSON notations and even though there are extensions to compress those data structures, such as CoOL, those extensions do not provide any solution to stop transmitting unnecessary information through the network to reduce the network bandwidth even more.

Embodiments herein provide a method at the first communication device 10 to observe the delta of a resource by transmitting a first indication, denoted as a Delta attribute, to the second communication device 12 and also methods to explicitly request the delta of e.g. a CoAP resource from the second communication device 12. CoAP resources may thus be treated in an atomic way, as minimal units of information and embodiments herein extend e.g. the CoAP protocol to observe partial changes in CoAP resources in different scenarios. This extension may be used in the *Observe protocol extension, Resource Directory* and GET and FETCH methods. In addition, a second indication denoted as an Entity-tag (ETag) attribute is extended to support the observation of partial modifications of the resource by indicating a partial update, in time, associated with the resource. The first communication device 10 then maintains an internal value of the part of the resource based on the second indication. Essentially, this new degree of granularity makes more efficient use of the network bandwidth and reduce the network traffic in e.g. the constrained networks.

Figure 2:
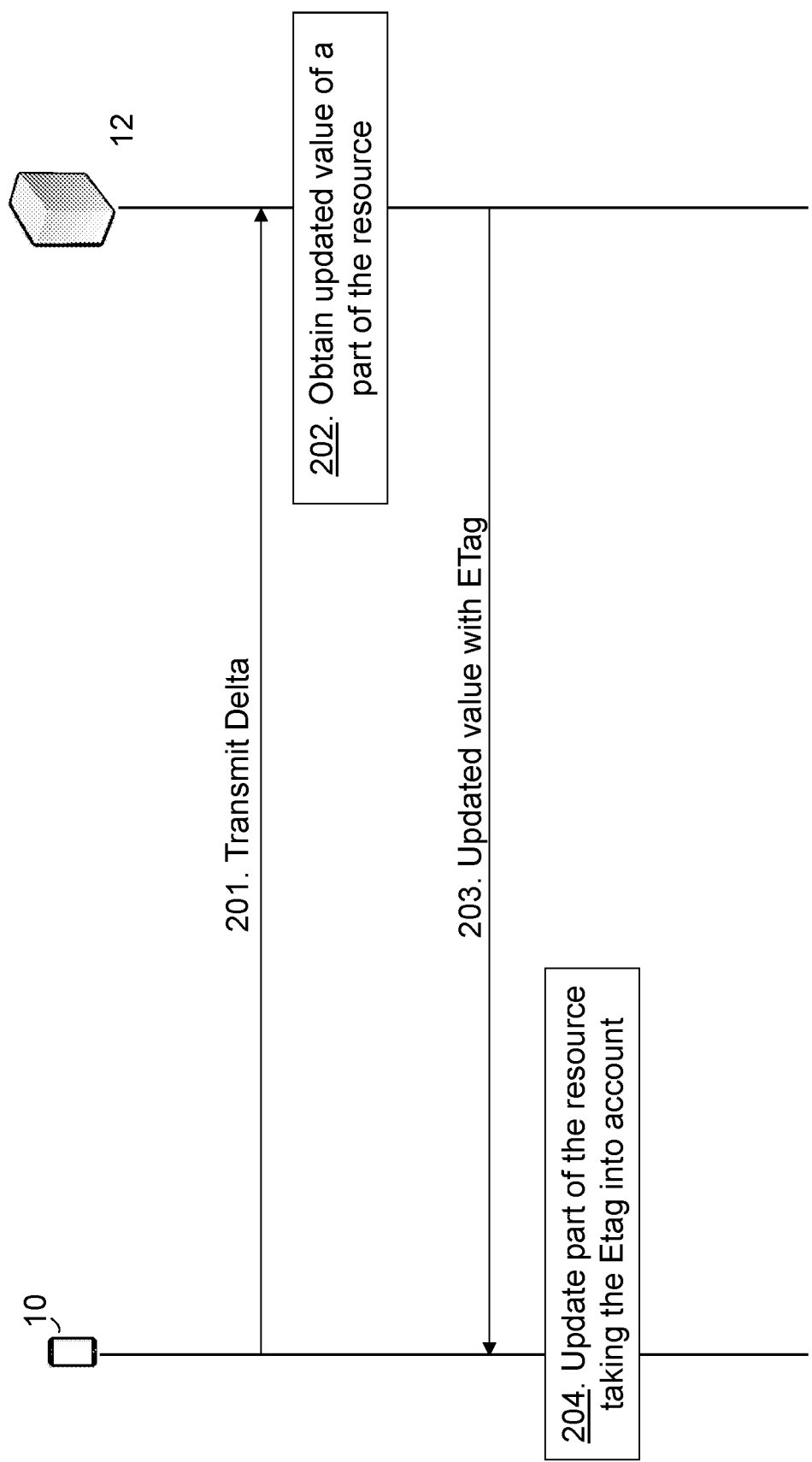
FIG. 2 is a combined flowchart and signalling scheme according to embodiments herein.

FIG. 2 is a combined signaling scheme and flowchart according to embodiments herein.

Action 201. The first communication device 10 transmits, to the second communication device 12, the first indication, i.e. the Delta attribute, indicating a configuration enabling the first communication device to receive a partial modification of resources. For example, the first communication device 10 may request to receive partial modifications of a certain resource.

Action 202. The second communication device 12, e.g. a resource directory, receives an updated value of a part of the resource. This may be obtained internally as well as from a different communication device.

Action 203. Since the first communication device 10 has indicated that it requests partial modifications, the second communication device 12 adds an ETag to the update and transmits the updated value of the part of the resource along with the ETag, i.e. the second indication. The ETag may indicate version of the data of the resource.

Action 204. The first communication device 10 receives the updated value of the part and the ETag, and compares the ETag with a previously stored ETag. Based on the outcome of the comparison the first communication device 10 may update the stored version of the data of the resource with the updated value of the part of the resource.

Embodiments herein thus provide a solution for e.g. CoAP comprising: Setting a new attribute delta (Dl) as delta attribute for performing e.g. an Observation of the Delta of a resource in CoAP; and using ETags as in Hypertext Transfer Protocol (HTTP) to define a delta attribute, i.e. define the part that has changed, and obtain partial modifications of a CoAP resource.

Advantages may be:
Provides a novel degree of granularity to observe partial modification of resources in CoAP.
Provides a method to partially request, e.g. extending FETCH, information of a resource.
Provides a method to partially request, e.g. extending GET, information of a resource.
This method prevents from transferring the whole IoT resource state unnecessarily.

The method efficiently uses the network resources, such as bandwidth, and the constrained network resources.
Enhanced and optimized the utilization of a Resource Directory in Constrained Networks.
Extend the Observe protocol extension to observe partial changes in resources.
Designed to be easy to integrate with the CoAP protocol As explained before, the existing CoAP methods GET, POST, PUT and FETCH allow the CoAP protocol to modify fully a CoAP resource. The PATCH and iPATCH methods allow for partial CoAP resource modifications as well. Embodiments herein define a new degree of granularity in resources being smaller than e.g. a CoAP resource, which granularity is called delta. The delta is defined as a difference between two instances of the same resource and embodiments herein further expand a definition of the "ETag" attribute to include the delta within its meaning. A resource is a network data object or service that can be identified by a URI. Resources may be available in multiple representations, e.g. multiple languages, data formats, size, and resolutions, or vary in other ways. For example, a resource may be the value of a sensor, file, document or similar.

Additionally, embodiments herein relating to CoAP use the "delta" attribute to observe resources in CoAP. Using the method described herein, a CoAP client using the Observe protocol extension receives the delta of a CoAP resource instead of the entire new instance. The first communication device 10 may be configured with a CoAP client that holds a cached copy of the old instance of the CoAP resource and may apply the delta to construct the new instance of the CoAP resource.

Briefly, two different attributes are used to define the delta of a resource: ETag and delta(dl). The ETag attribute is defined in the Constrained Application Protocol document, being an entity-tag intended to be used as a resource-local identifier for differentiating between representations of the same CoAP resource that changes over time. Embodiments herein add ETag attributes to be used for partial modifications. Thus, a CoAP server, such as the second communication device 12, may send a partial modification of a CoAP resource that has changed over time instead of sending the whole CoAP resource. Different CoAP methods, e.g. GET and FETCH, may include the ETag attribute in its messages to obtain more precise information of a resource too.

Figure 3:
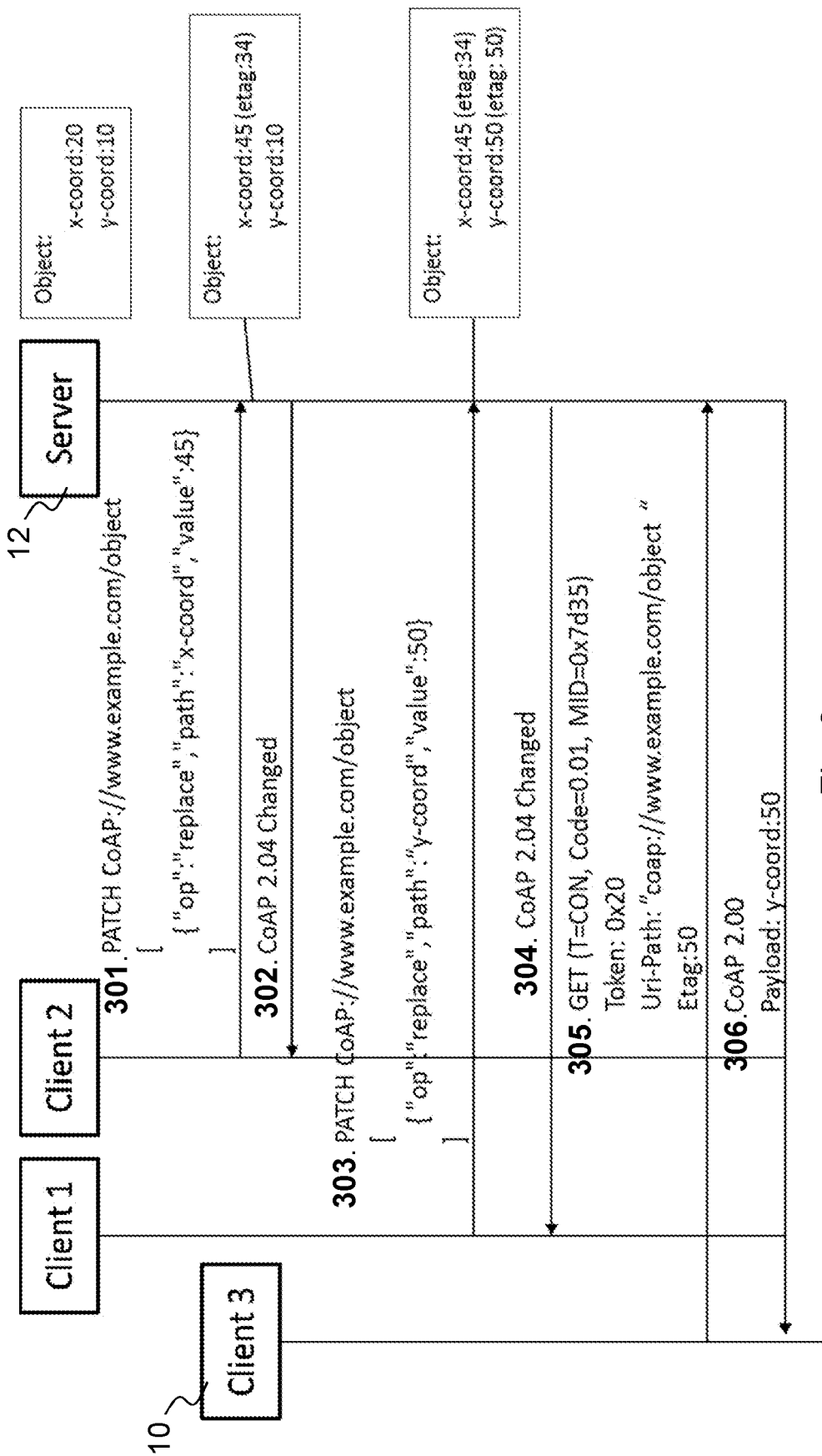
FIG. 3 is a signalling scheme according to embodiments herein.

FIG. 3 shows an example of two clients updating partially a CoAP resource using the PATCH operation, see actions 301-304. 'op' stands for operation, x-coord=x coordinate, y-coord=y coordinate and 'replace' is the name of the operation but could be any other name. CON means Confirmable, meaning that the client expects a confirmation that the message sent has arrived to the destination. MID means message id and every message has an identifier, and T stands for type of message. Token means that a Token is used to match responses to requests independently from the underlying messages.

After the CoAP resource is updated several times by different clients, client 3, i.e. the first communication device 10, is just interested in a particular update of the CoAP resource. Thus, client 3 indicates that it is only interested in the update of the resource's instance with identifier 50, action 305. The CoAP server, i.e. the second communication device 12, provides the client 3 with the partial update of that instance instead of all the other updates of the CoAP resource, action 306. In addition, an ETag could be assigned to every client modifying a CoAP resource. Thus, another CoAP client could ask for the updates of a single CoAP client enabling e.g. the client 3 to detect change of a part of the resource of every client. Even though that case is feasible, it requires all the CoAP clients that updated a CoAP resource to be authenticated in the system. The Delta (dl) is a new CoAP attribute defined herein, which Delta attribute informs the CoAP server about the willingness of a CoAP client, such as the client 3, to receive a partial modification of a CoAP resource instead of the whole resource. The delta attribute may be used in the Observe protocol extension.

Figure 4:
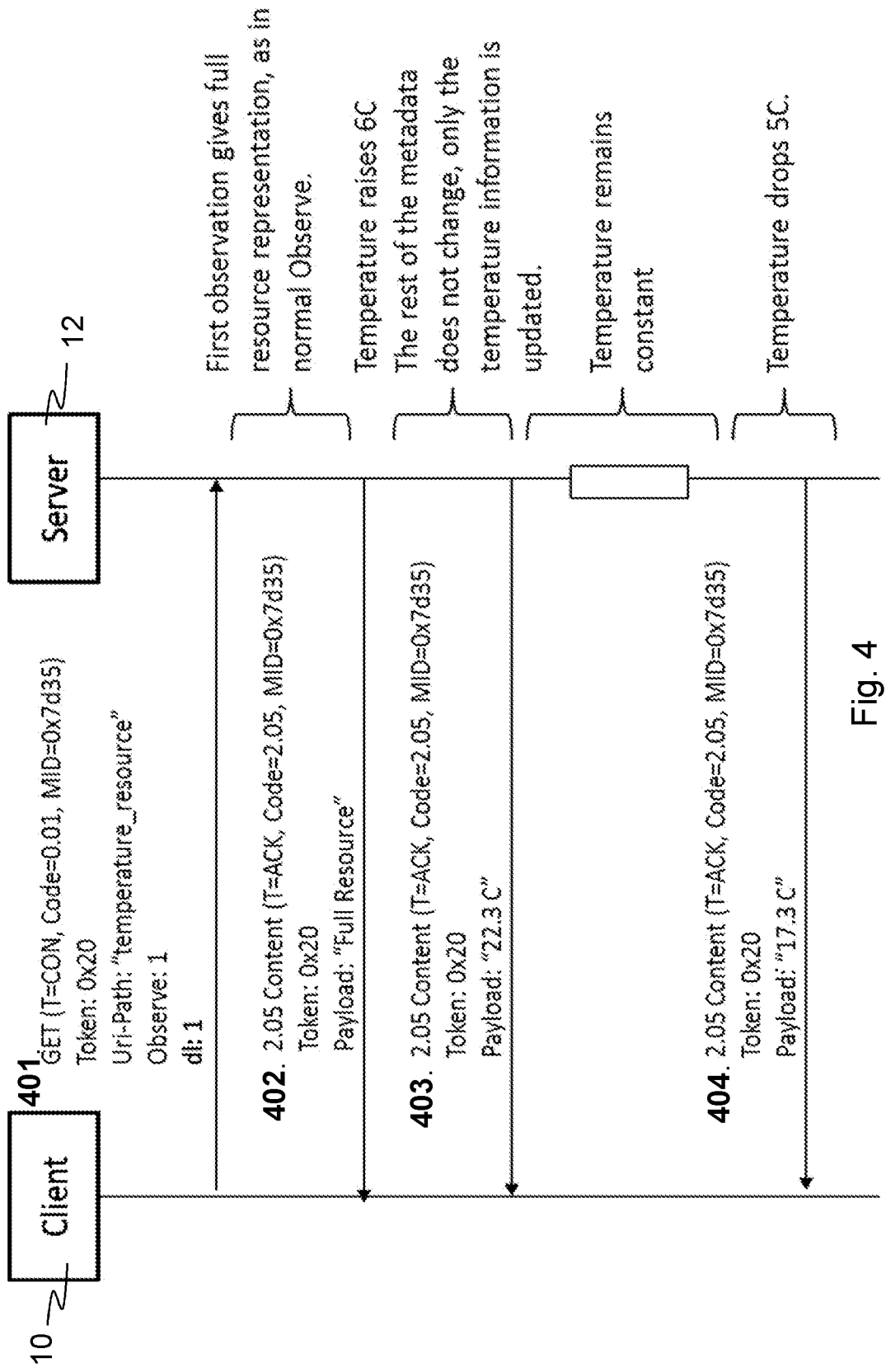
FIG. 4 is a signalling scheme according to embodiments herein.

FIG. 4 shows an example of how the new delta attribute could be used in e.g. CoAP. CON means Confirmable, meaning that the client expects a confirmation that the message sent has arrived to the destination. ACK means Acknowledgement and is used to confirm a received message. MID means message id and every message has an identifier, and T stands for type of message. Token means that a Token is used to match responses to requests independently from the underlying messages.

In the example, a CoAP client being an example of the first communication device 10 performs an observation of a CoAP resource with the first indication, also denoted herein as the delta attribute or a "dl" tag, e.g. the value is set to 1. Action 401: The CoAP client may observe a resource on a CoAP server, being an example of the second communication device 12, with both "dl" and "observe" tags activated i.e. values are set to 1. A first Notification from the CoAP server contains a full representation of the resource, e.g. values, units, min, max, see Action 402. The payload of following notifications will only contain modified values, as indicated by the delta attribute, of the CoAP resource e.g. value only, since units, min and max do not change, actions 403, 404.

Note that the name of the Dl attribute and its values are irrelevant. Different names and values could be used to define the attribute.

The first and second indications, Delta (dl) attribute and ETag, may be used in a different number of scenarios in CoAP. Besides using the ETag with different CoAP methods, e.g. GET and FETCH, and the dl attribute with the Observe protocol, both attributes could be used to filter the information in a resource directory too. Performing a GET request "/.well-known/core" to the resource directory returns a set of links available from the server (if any) in the CoRE Link Format. Most of the time, a CoAP client is interested in some specific parts of a CoAP resource, and obtaining again the pieces of information that have not changed can flood the CoAP client with unnecessary information. In this case, the ETag and dl attributes may be used to mitigate this issue.

ETag may be used in the resource directory to fetch partial information of a resource that has been created or changed at certain time. If the resource directory keeps historical track of the information, a CoAP client can fetch that information using the ETag and the CoAP methods such as GET. Entity tags (ETag) are used for comparing two or more entities from the same requested resource. HTTP/1.1 uses entity tags in the ETag, If-Match, If-None-Match, and If-Range header fields. The Etag comprises an opaque quoted string and may be used to find out whether a cache entry is an equivalent copy of an entity. An entity tag is unique across all versions of all entities associated with a particular resource. A given entity tag value MAY be used for entities obtained by requests on different URIs. The use of the same entity tag value in conjunction with entities obtained by requests on different URIs does not imply the equivalence of those entities. An ETag response header field may indicate the current value of the entity tag for the requested variant just created and the ETag response-header field provides the current value of the entity tag for the requested variant.

Delta (dl) attribute can be used by the first communication device 10 such as a CoAP client to subscribe to partial information of a CoAP resource. The CoAP client might be interested about some specific information of a CoAP resource. In addition, the CoAP client can subscribe to a resource but inform to the resource directory to send just the information that is periodically modified instead of the whole new instance. The CoAP client may do that by attaching the dl attribute to its registration request (GET) operation.

Figure 5:
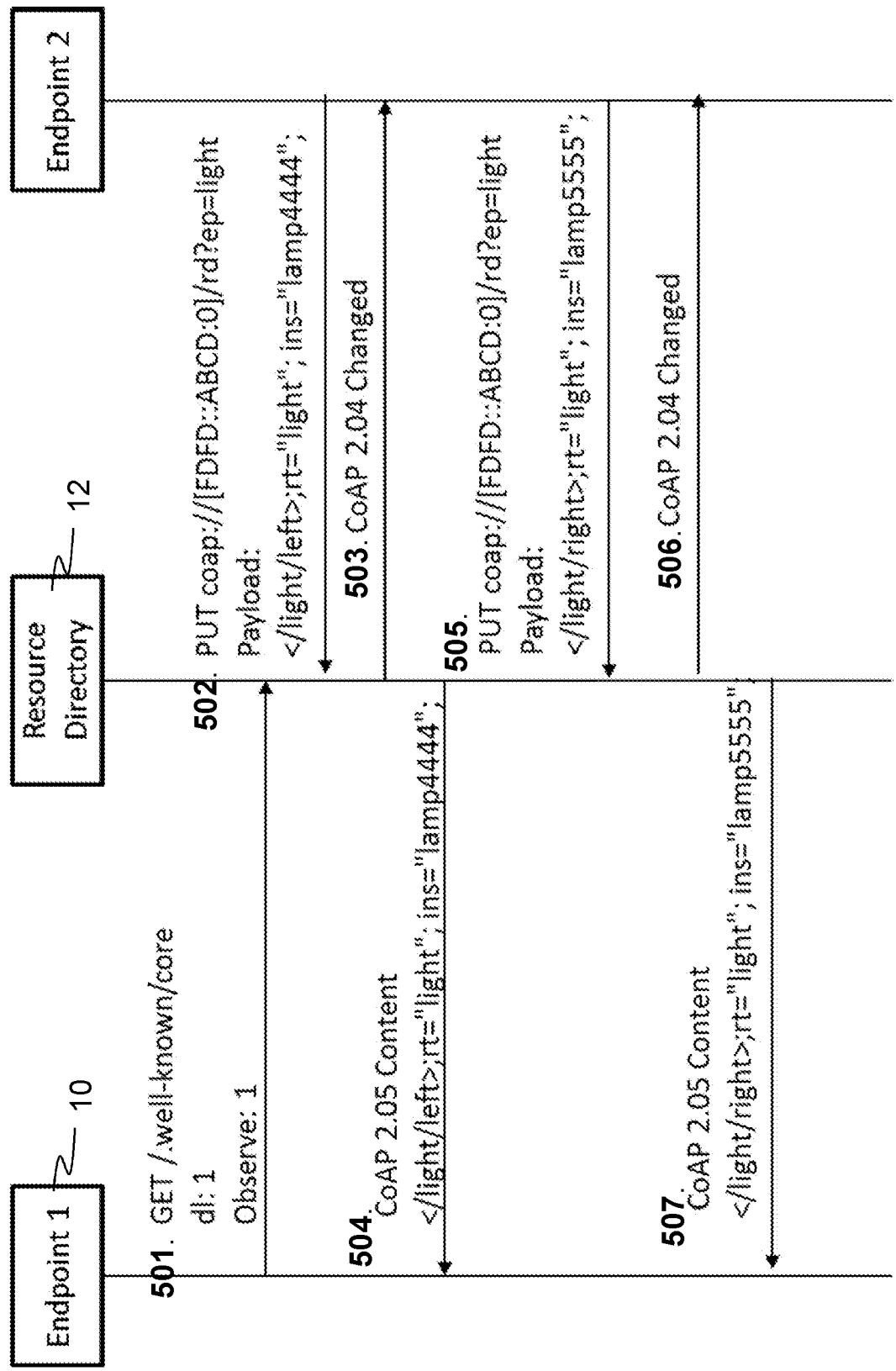
FIG. 5 is a signalling scheme according to embodiments herein.

A Resource Directory (RD) is used to store pointers to where resources are stored. Normally, CoAP clients will register new resources as they appear (e.g. a new light or temperature sensor). It is therefore convenient, even if not specified in the standards, to perform a GET Observe on the Resource Directory itself. This way, clients would receive a notification for every new registered resource. However without the "dl" attribute as specified in this invention, clients receive the whole RD every time, as they are observing the root path. FIG. 5 shows an example of using the Delta attribute for observing root directories, in particular where a Resource Directory is an example of the second communication device 12. 'Rt' means Resource Type and is an attribute that is an opaque string used to assign an application-specific semantic type to a resource. 'Ins' means Resource Instance and maps to the <Instance> part of a Domain Name System Service Discovery (DNS-SD) service name. 'Ep' means endpoint and Rd means resource directory. The codes 2.03 and 2.05 are Response codes. The figure shows two endpoints: EP1 and EP2. EP1, being an example of the first communication device 10, performs an observation with the dl attribute on the Resource Directory (RD), action 501. Normally this would mean that the RD would treat the full RD as a resource, sending an update of the full RD every time a part of the resource is updated. This is not ideal since the RD can grow to a considerable size. EP2 registers a new light resource, actions 502-503, and since the dl attribute is on, EP1 will receive only the delta of the Resource Directory, i.e. the new part of the resource, action 504. Over time as new resource parts are added/deleted by EP2, actions 505-506, EP1 will be notified accordingly only about the updated information, action 507.

Figure 6:
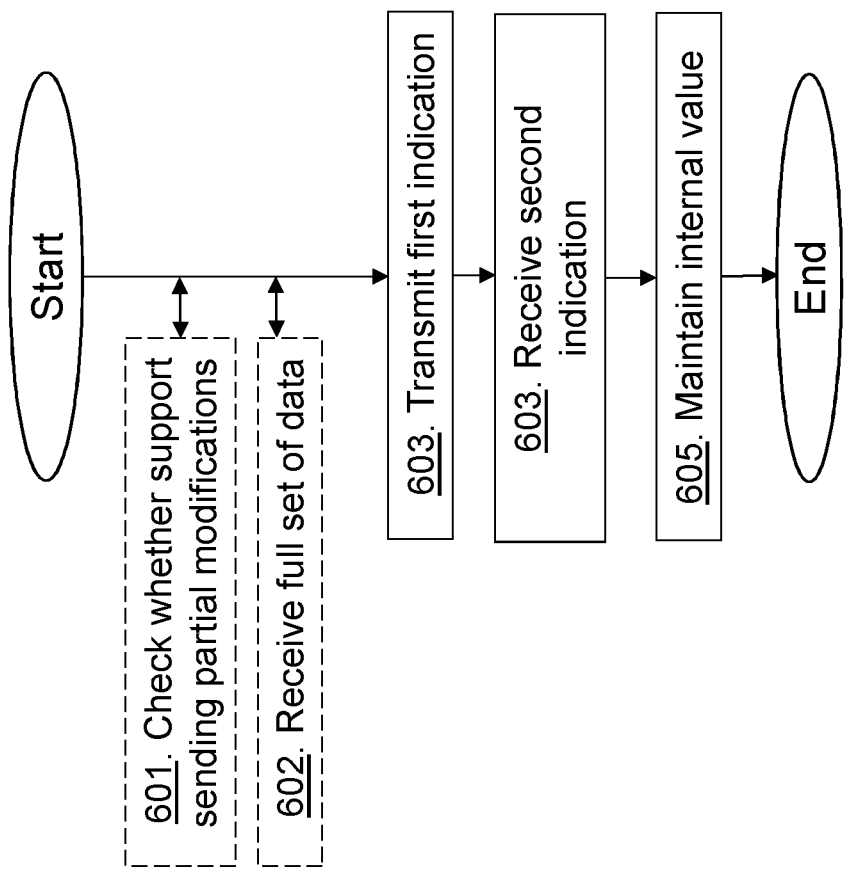
FIG. 6 is a flowchart depicting a method performed by a first communication device according to embodiments herein.

The method actions performed by the first communication device 10 for handling data in the communication network 1 according to some embodiments will now be described with reference to a flowchart depicted in FIG. 6. The actions do not have to be taken in the order stated below, but may be taken in any suitable order. Actions performed in some embodiments are marked with dashed boxes. The first communication device 10 may be a M2M device. The communication network may be a constrained network. The resources may be Constrained Application Protocol resources.

Action 601. The first communication device 10 may check whether the second communication device 12 supports sending partial modifications of resources.

Action 602. The first communication device 10 may receive a full set of data of the resource.

Action 603. The first communication device 10 transmits, to the second communication device 12, the first indication, e.g. the delta attribute, indicating a configuration enabling the first communication device 10 to receive a partial modification of resources. The first indication may be comprised in a message indicating that the communication device 10 subscribes to or requests partial information of one or more resources. The first communication device 10 may further transmit an identification indicating the resource, e.g. an URI. The first indication and the identification may be sent in a single message indicating a request to retrieve information.

Action 604. The first communication device 10 receives, from the second communication device 12, the second indication indicating a partial update, in time, associated with a resource and a value of a part of the resource. The second indication may identify a partial modification of a resource in time. The second indication may identify a version in time of the partial update of the resource. The first communication device may receive several second indications, which are assigned to the same resource. The second indication indicates a set of resources, e.g. the second communication device 12 may return several resources in the same response. The first indication may be denoted a delta attribute and the second indication may be denoted an entity tag attribute.

Action 605. The first communication device 10 maintains an internal value of the part of the resource based on the second indication. E.g. updates the internal value to the received value of the part of the resource. The first communication device 10 may e.g. compare the second indication with a previously stored indication and update the internal value of the part of the resource to the received value when the second indication is a consecutive value to the previously stored indication. The first communication device 10 may maintain the internal value of the part of the resource comprises updating the internal value of a part of the full set of data taking the second indication into account. It is thus herein disclosed a method to interact with resources in a more granular way in e.g. Internet of Things. Resources in Internet of Things are treated in an atomic way, as minimal units of information and the method may be for partially update resources in Internet of Things. The new degree of granularity may make more efficient use of the network bandwidth and the limited resources of the constrained networks. Furthermore, the method may include performing an Observation of two instances of the same information in time; and using ETags to classify the different instances over time.

Figure 7:
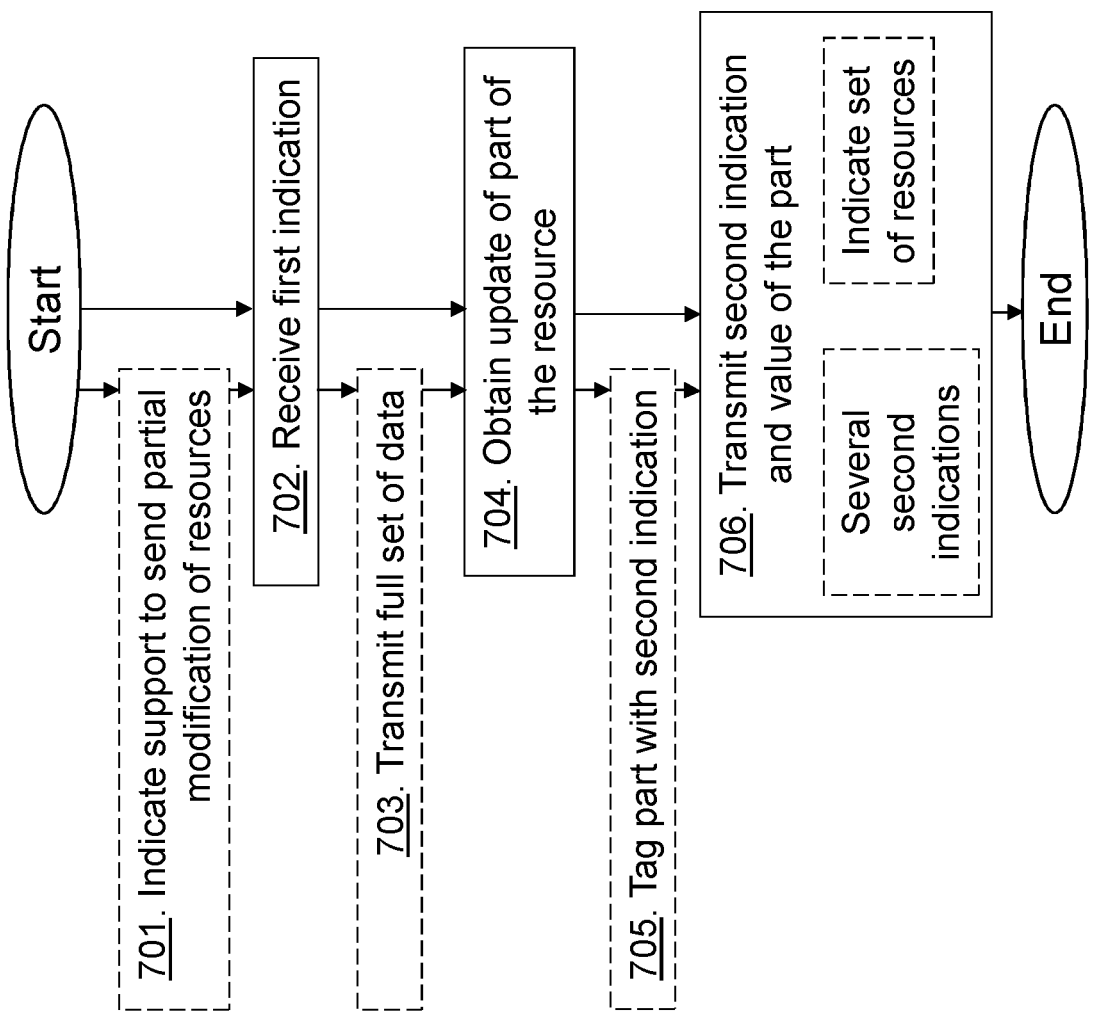
FIG. 7 is a flowchart depicting a method performed by a second communication device according to embodiments herein.

The method actions performed by the first communication device 10 for handling data in the communication network 1 according to some embodiments will now be described with reference to a flowchart depicted in FIG. 7. The actions do not have to be taken in the order stated below, but may be taken in any suitable order. Actions performed in some embodiments are marked with dashed boxes. The second communication device 12 provides data of a resource to the first communication device 10 in the communication network and may e.g. be a server or a directory. The communication network may be a constrained network. The resources may be Constrained Application Protocol resources. The first indication may be denoted the delta attribute (Delta) and the second indication may be denoted the entity tag attribute (ETag).

Action 701. The second communication device 12 may indicate support to send, or in sending, partial modifications of resources.

Action 702. The second communication device 12 receives, from the first communication device 10, the first indication. The first indication indicates the configuration enabling the first communication device 10 to receive a partial modification of resources. The first indication may be comprised in the message indicating that the first communication device 10 subscribes to or requests partial information of one or more resources. The second communication device 12 may further receive an identification indicating the resource such as a URI.

Action 703. The second communication device 12 may transmit the full set of data of the resource to the first communication device 10.

Action 704. The second communication device 12 obtains, internally or from another communication device, the update of a part of the resource, which update comprises a value or a set of values.

Action 705. The second communication device 12 may then tag the part of the resource with the second indication. The second indication may identify a partial modification of the resource in time. The second indication may e.g. identify a version in time of the partial update of the resource.

Action 706. The second communication device 12 transmits the second indication indicating the partial update, in time, associated with the resource. The second communication device further transmits the value of the part of the resource. The second communication device 12 may transmit several second indications, which are assigned to the same resource, hence, improving the granularity of the operation by splitting the resources with different indications. The second indication may indicate a set of resources and thus the second communication device 12 may return several resources in the same response.

Figure 8:
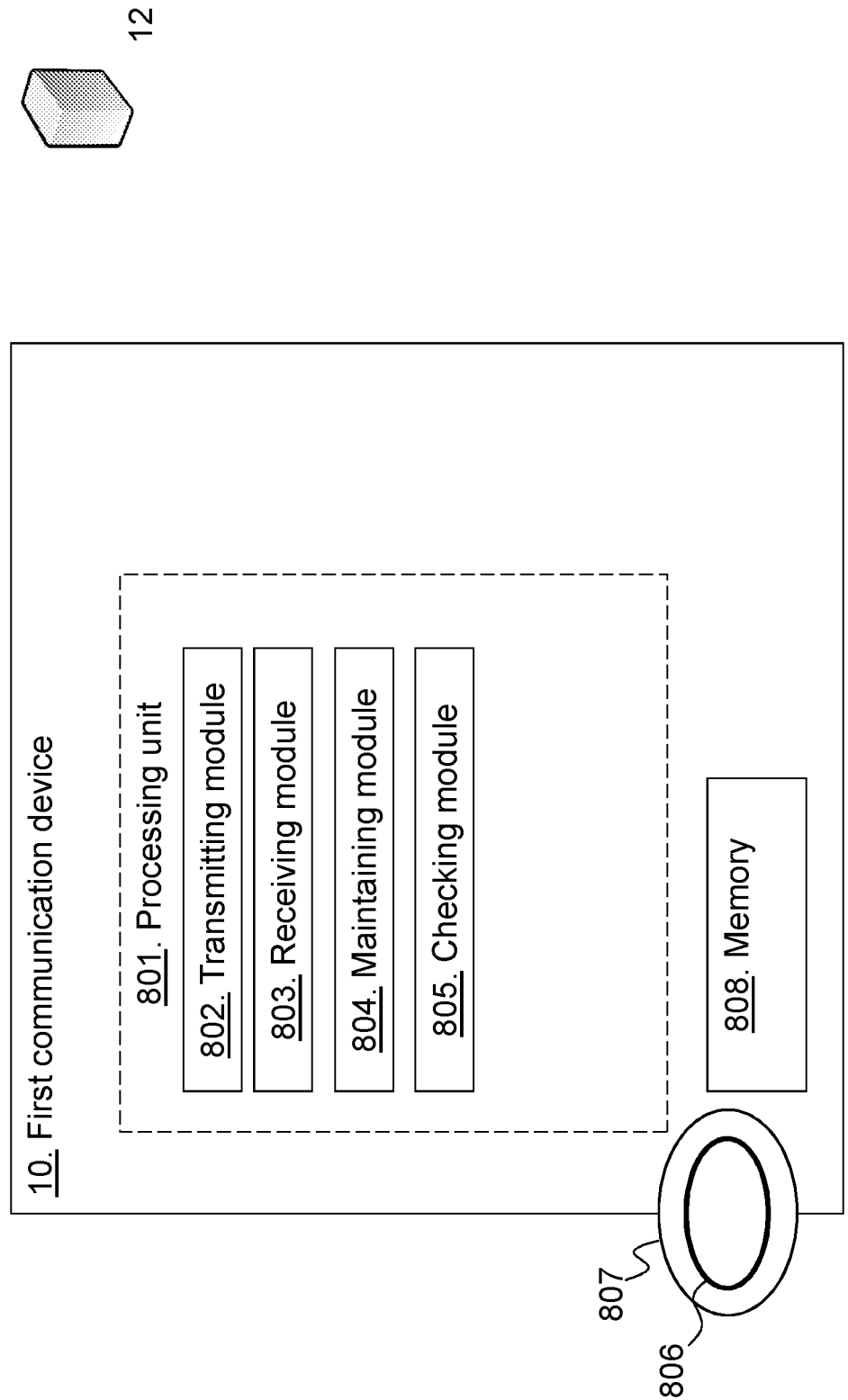
FIG. 8 is a block diagram depicting a first communication device according to embodiments herein.

FIG. 8 is a block diagram depicting the first communication device 10, e.g. a sensor, a CoAP client, or similar, for handling data in the communication network 1.

The first communication device 10 may comprise a processing unit 801, e.g. one or more processors, being configured to perform the methods herein.

The first communication device 10 comprises a transmitting module 802. The first communication device 10, the processing unit 801, and/or the transmitting module 802 may be configured to transmit, to the second communication device 12, the first indication indicating the configuration enabling the first communication device 10 to receive a partial modification of resources. The first indication may be comprised in the message indicating that the first communication device 10 subscribes to or requests partial information of one or more resources. The first communication device 10, the processing unit 801, and/or the transmitting module 802 may be configured to transmit the identification indicating the resource.

The first communication device 10 comprises a receiving module 803. The first communication device 10, the processing unit 801, and/or the receiving module 803 may be configured to receive, from the second communication device 12, the second indication indicating the partial update, in time, associated with the resource and the value of the part of the resource. The second indication may identify the version in time of the partial update of the resource. The first communication device 10, the processing unit 801, and/or the receiving module 803 may be configured to receive several second indications, which are assigned to the same resource. The second indication may indicate the set of resources.

The first communication device 10 comprises a maintaining module 804. The first communication device 10, the processing unit 801, and/or the maintaining module 804 may be configured to maintain the internal value of the part of the resource based on the second indication. The first communication device 10, the processing unit 801, and/or the maintaining module 804 may be configured to maintain the internal value by being configured to compare the second indication with a previously stored indication and to update the internal value of the part of the resource to the received value when the second indication is the consecutive value to the previously stored indication. The first communication device 10, the processing unit 801, and/or the receiving module 803 may be configured to receive the full set of data of the resource; and the first communication device 10, the processing unit 801, and/or the maintaining module 804 may be configured to maintain the internal value of the part of the resource by being configured to update the internal value of the part of the full set of data taking the second indication into account.

The first communication device 10 comprises a checking module 805. The first communication device 10, the processing unit 801, and/or the checking module 805 may be configured to check whether the second communication device 12 supports sending partial modifications of resources.

The methods according to the embodiments described herein for the first communication device 10 are respectively implemented by means of e.g. a computer program 806 or a computer program product, comprising instructions, i.e., software code portions, which, when executed on at least one processor, cause the at least one processor to carry out the actions described herein, as performed by the first communication device 10. The computer program 806 may be stored on a computer-readable storage medium 807, e.g. a disc or similar. The computer-readable storage medium 807, having stored thereon the computer program, may comprise the instructions which, when executed on at least one processor, cause the at least one processor to carry out the actions described herein, as performed by the first communication device 10. In some embodiments, the computer-readable storage medium may be a non-transitory computer-readable storage medium.

The first communication device 10 further comprises a memory 808. The memory comprises one or more units to be used to store data on, such as full set of data of the resource, Delta attributes and ETag attributes, mappings of second indications to parts of resources in time e.g. versions, applications to perform the methods disclosed herein when being executed, and similar.

Figure 9:
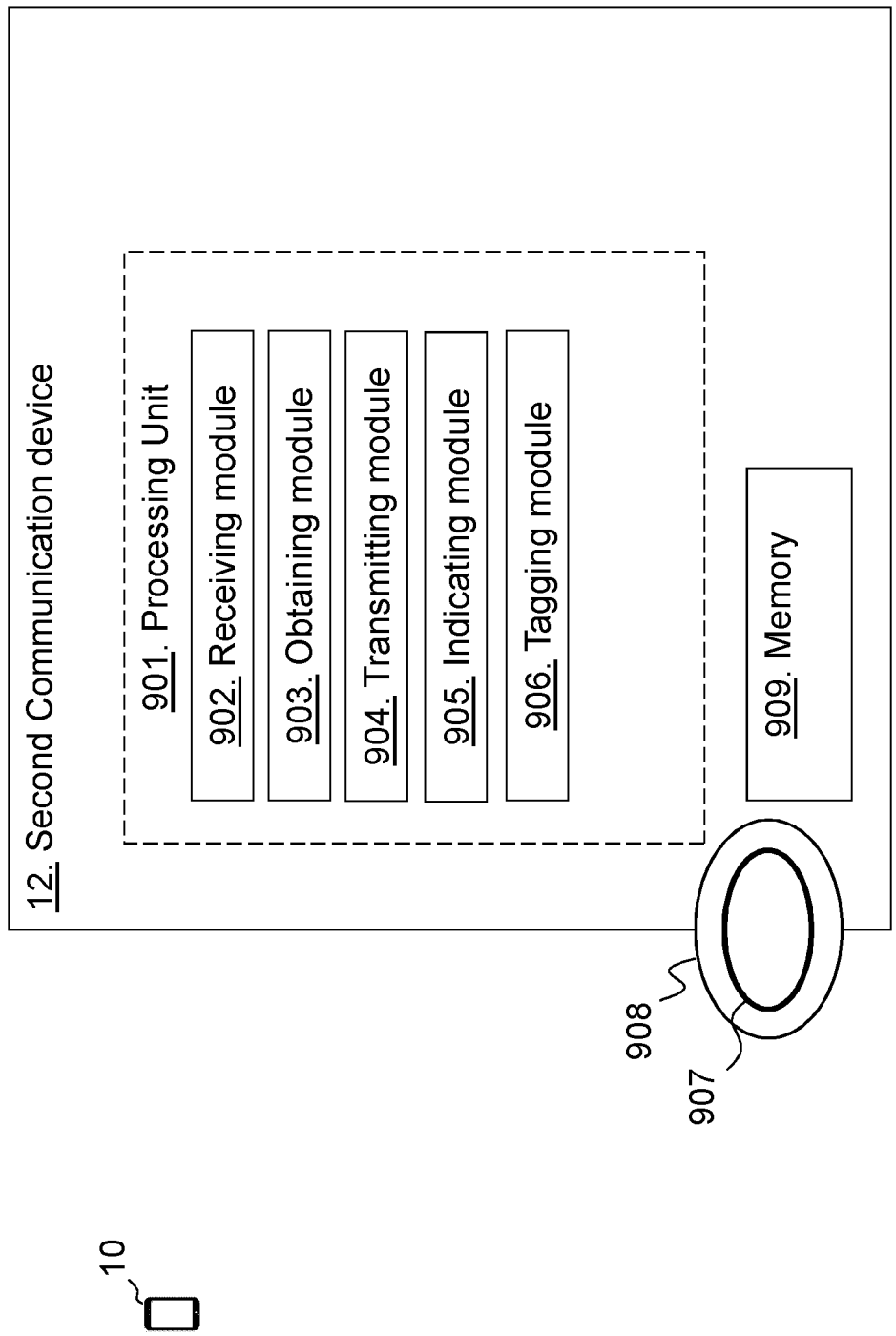
FIG. 9 is a block diagram depicting a second communication device according to embodiments herein.

FIG. 9 is a block diagram depicting the second communication node 12, e.g. 20 second endpoint or Internet server, or CoAP server, for handling data in the communication network 1. The second communication device 12 is configured to provide data of the resource to the first communication device 10 in the communication network 1.

The second communication node 12 may comprise a processing unit 901, e.g. one or more processors, being configured to perform the methods herein.

The second communication node 12 comprises a receiving module 902. The second communication node 12, the processing unit 901, and/or the receiving module 902 may be configured to receive, from the first communication device 10, the first indication indicating the configuration enabling the first communication device 10 to receive a partial modification of resources. The first indication may be comprised in the message indicating that the first communication device 10 subscribes to or requests partial information of one or more resources. The second communication node 12, the processing unit 901, and/or the receiving module 902 may be configured to receive the identification indicating the resource such as the URI.

The second communication node 12 comprises an obtaining module 903. The second communication node 12, the processing unit 901, and/or the obtaining module 903 may be configured to obtain internally or from another communication device, the update of the part of the resource, which update comprises a value.

The second communication node 12 comprises a transmitting module 904. The second communication node 12, the processing unit 901, and/or the transmitting module 904 may be configured to transmit the second indication indicating the partial update, in time, associated with the resource and the value of the part of the resource. The second indication may identify the version in time of the partial update of the resource. The second communication node 12, the processing unit 901, and/or the transmitting module 904 may be configured to transmit several second indications, which are assigned to the same resource. The second indication may indicates the set of resources. The second communication node 12, the processing unit 901, and/or the transmitting module 904 may be configured to transmit to the first communication device 10, a full set of data of the resource.

The second communication node 12 comprises an indicating module 905. The second communication node 12, the processing unit 901, and/or the indicating module 905 may be configured to indicate support to send partial modification of resources.

The second communication node 12 comprises a tagging module 906. The second communication node 12, the processing unit 901, and/or the tagging module 906 may be configured to tag the part of the resource with the second indication.

The methods according to the embodiments described herein for the second communication node 12 are respectively implemented by means of e.g. a computer program 907 or a computer program product, comprising instructions, i.e., software code portions, which, when executed on at least one processor, cause the at least one processor to carry out the actions described herein, as performed by the second communication node 12. The computer program 907 may be stored on a computer-readable storage medium 908, e.g. a disc or similar. The computer-readable storage medium 908, having stored thereon the computer program, may comprise the instructions which, when executed on at least one processor, cause the at least one processor to carry out the actions described herein, as performed by the second communication node 12. In some embodiments, the computer-readable storage medium may be a non-transitory computer-readable storage medium.

The second communication node 12 further comprises a memory 909 and communication interfaces. The memory comprises one or more units to be used to store data on, such as full set of data of the resource, Delta attributes and ETag attributes, mappings of second indications to parts of resources in time e.g. versions, applications to perform the methods disclosed herein when being executed, and similar.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a communication device, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communication devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a Constrained Application Protocol (CoAP) client for handling data in a constrained network, the method comprising:
    transmitting, to a CoAP server, a first indication denoted as a delta attribute indicating a configuration enabling the CoAP client to receive a partial modification of CoAP resources, and wherein the delta attribute and a uniform resource identifier (URI) that identifies a CoAP resource within the CoAP resources are combined in a single message to request the partial modification of the CoAP resource;
    receiving, from the CoAP server, a second indication denoted as an Entity-tag attribute indicating a partial update associated with the CoAP resource corresponding to any one of previous modifications to the CoAP resource and a value of a part of the CoAP resource; and
    maintaining an internal value of the part of the CoAP resource based on the second indication, wherein the second indication indicates a set of CoAP resources.

2. The method according to claim 1, wherein the second indication identifies a version in time of the partial update of the CoAP resource.

3. The method according to claim 1, wherein maintaining comprises comparing the second indication with a previously stored indication and updating the internal value of the part of the CoAP resource to a received value when the second indication is a consecutive value to the previously stored indication.

4. The method according to claim 1, wherein the first indication is comprised in a message indicating that the CoAP client subscribes to or requests partial information of one or more CoAP resources.

5. The method according to claim 1, further comprising:
    receiving a full set of data of the CoAP resource; and
    the maintaining the internal value of the part of the CoAP resource comprises updating the internal value of a part of the full set of data, taking the second indication into account.

6. A method performed by a Constrained Application Protocol (CoAP) server for handling data in a constrained network, wherein the CoAP server provides data of a CoAP resource to a CoAP client in the constrained network, the method comprising:
    receiving, from the CoAP client, a first indication denoted as a delta attribute indicating a configuration enabling the CoAP client to receive a partial modification of CoAP resources, and wherein the delta attribute and a uniform resource identifier (URI) that identifies a CoAP resource within the CoAP resources are combined in a single message to request the partial modification of the CoAP resource;
    obtaining, internally or from another communication device, an update of a part of the CoAP resource corresponding to any one of previous modifications to the CoAP resource, wherein the update comprises a value; and
    transmitting a second indication denoted as an Entity-tag attribute indicating a partial update associated with the CoAP resource and the value of the part of the CoAP resource, wherein the second indication indicates a set of CoAP resources.

7. The method according to claim 6, further comprising:
    indicating support to send the partial modification of CoAP resources.

8. The method according to claim 6, further comprising:
    tagging the part of the CoAP resource with the second indication.

9. The method according to claim 6, wherein the second indication identifies a version in time of the partial update of the CoAP resource.

10. The method according to claim 6, wherein the transmitting comprises transmitting several second indications assigned to a same CoAP resource.

11. The method according to claim 6, wherein the first indication is comprised in a message indicating that the CoAP client subscribes to or requests partial information of one or more CoAP resources.

12. A Constrained Application Protocol (CoAP) client for handling data in a constrained network, wherein the CoAP client comprises a memory and a processing unit that is associated with the memory and configured to:
    transmit, to a CoAP server, a first indication denoted as a delta attribute indicating a configuration enabling the CoAP client to receive a partial modification of CoAP resources, and wherein the delta attribute and a uniform resource identifier (URI) that identifies a CoAP resource within the CoAP resources are combined in a single message to request the partial modification of the CoAP resource;
    receive, from the CoAP server, a second indication denoted as an Entity-tag attribute indicating a partial update associated with the CoAP resource corresponding to any one of previous modifications to the CoAP resources and a value of a part of the CoAP resource; and
    maintain an internal value of the part of the CoAP resource based on the second indication, wherein the second indication indicates a set of CoAP resources.

13. The CoAP client according to claim 12, wherein the second indication identifies a version in time of the partial update of the CoAP resource.

14. The CoAP client according to claim 12, wherein the processing unit is further configured to receive a full set of data of the CoAP resource; and to maintain the internal value of the part of the CoAP resource by being configured to update the internal value of a part of the full set of data, taking the second indication into account.

15. A Constrained Application Protocol (CoAP) server for handling data in a constrained network, wherein the CoAP server comprises a memory and a processing unit that is associated with the memory and configured to:

provide data of a CoAP resource to a CoAP client in the constrained network;

receive, from the CoAP client, a first indication denoted as a delta attribute indicating a configuration enabling the CoAP client to receive a partial modification of CoAP resources, and wherein the delta attribute and a uniform resource identifier (URI) that identifies a CoAP resource within the CoAP resources are combined in a single message to request the partial modification of the CoAP resource;

obtain internally or from another communication device, an update of a part of the CoAP resource, wherein the update comprises a value; and transmit a second indication denoted as an Entity-tag attribute indicating a partial update associated with the CoAP resource corresponding to any one of previous modifications to the CoAP resources and the value of the part of the CoAP resource, wherein the second indication indicates a set of CoAP resources.

16. The CoAP server according to claim 15, wherein the processing unit is further configured to tag the part of the CoAP resource with the second indication.

17. The CoAP server according to claim 15, wherein the second indication identifies a version in time of the partial update of the CoAP resource.

18. The CoAP server according to claim 15, wherein the processing unit is further configured to transmit several second indications assigned to a same CoAP resource.

* * * * *